United States Patent [19]
Gaylord

[11] 3,785,597
[45] Jan. 15, 1974

[54] PARACHUTE HARNESS RELEASE
[75] Inventor: John A. Gaylord, Greenbrae, Calif.
[73] Assignee: H. Koch & Sons, Inc., Corte Madera, Calif.
[22] Filed: Mar. 6, 1972
[21] Appl. No.: 231,994

[52] U.S. Cl. .......................... 244/151 A, 24/73 PH
[51] Int. Cl. ...................... B64d 17/30, B64d 17/38
[58] Field of Search .................... 244/151 A, 151 B, 244/151 R, 147, 122 B; 285/33, 304, DIG. 21; 24/73 PH

[56] References Cited
UNITED STATES PATENTS
| | | | |
|---|---|---|---|
| 2,726,832 | 12/1955 | Gimalouski | 244/151 A |
| 3,567,158 | 3/1971 | Coyle | 244/122 B |
| 3,632,066 | 1/1972 | Brown | 244/151 A |
| 3,658,281 | 4/1972 | Gaylord | 244/151 A |

Primary Examiner—George E. A. Halvosa
Assistant Examiner—Barry L. Kelmachter
Attorney—George B. White

[57] ABSTRACT

A manipulable device for piercing a cartridge releases gas under pressure into conduits to release all the buckles of the harness. The buckles are also releasable manually. Between the gas connection to the buckles on the lap belt and the manipulable device or cartridge casing is a disconnect anchored to the plane which, when the pilot is ejected from the plane, disconnects the gas connection of the lap belt buckles from the gas supply or cartridge casing, so that when the crewman lands, he can manipulate the cartridge piercing device to be quickly released from the parachute harness, without releasing the lap belt buckles which latter support the survival kit in convenient position on the crew man.

8 Claims, 6 Drawing Figures

PARACHUTE HARNESS RELEASE

BACKGROUND OF THE INVENTION

It is vital for aircraft personnel such as a pilot to be able to free himself from his parachute harness and from the seat quickly in case of emergency while on the ground in the plane. It is equally vital to be able to free himself speedily from his parachute harness after landing, yet to retain his survival kit.

The primary object of the invention is to provide a gas actuated device for releasing the buckles of the parachute harness and also the buckles of the lap belts which latter support the survival kit, but upon ejection from the plane to automatically render inoperative the gas connection to the buckles of the lap belts, thereby to permit gas actuated disconnection of all buckles while in the aircraft, but limit gas actuation to the parachute harness buckles after ejection; all the buckles being also manipulable individually for manual release.

DETAILED DESCRIPTION

Figures 1, 2, 3:
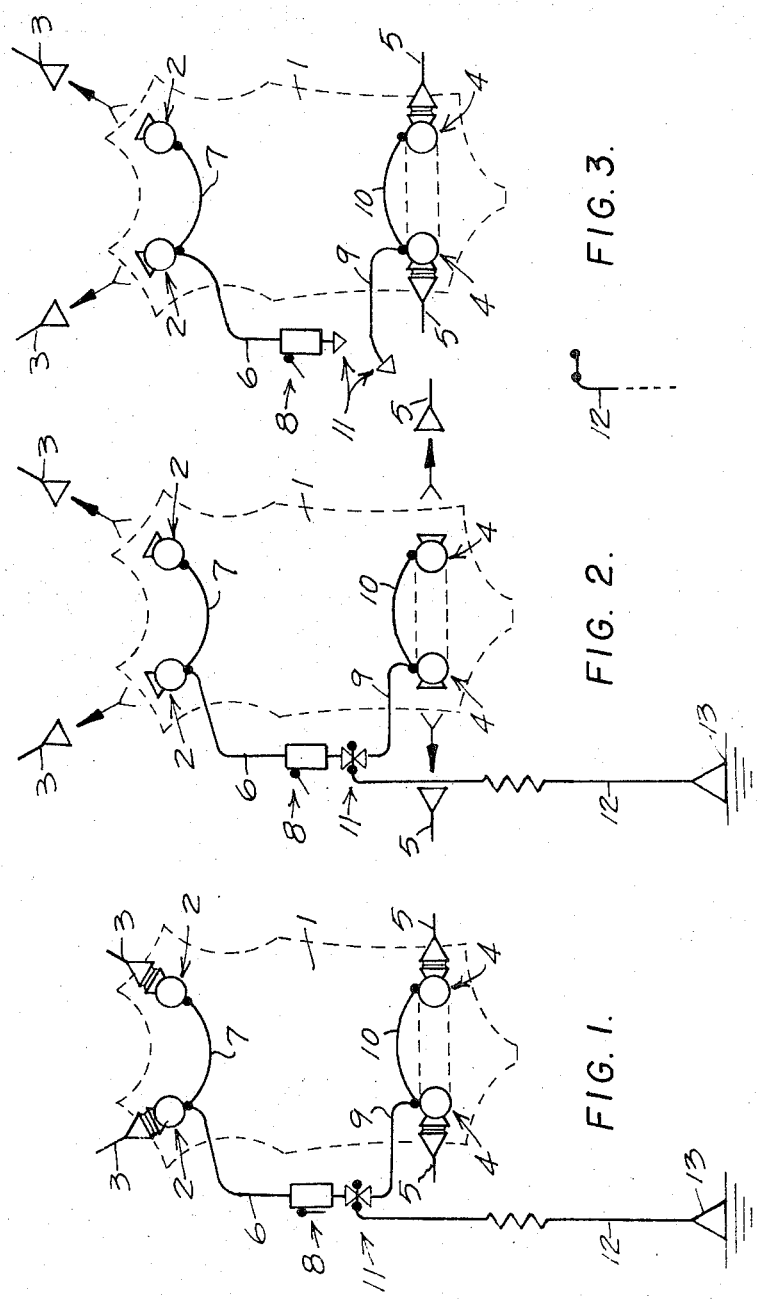
FIG. 1 is a diagrammatic view showing the complete gas connections while in the aircraft.
FIG. 2 is a diagrammatic view showing all the buckles disconnected.
FIG. 3 is a diagrammatic view showing the gas connection of the lap belt buckles disconnected after ejection from the aircraft.
Figure 4:
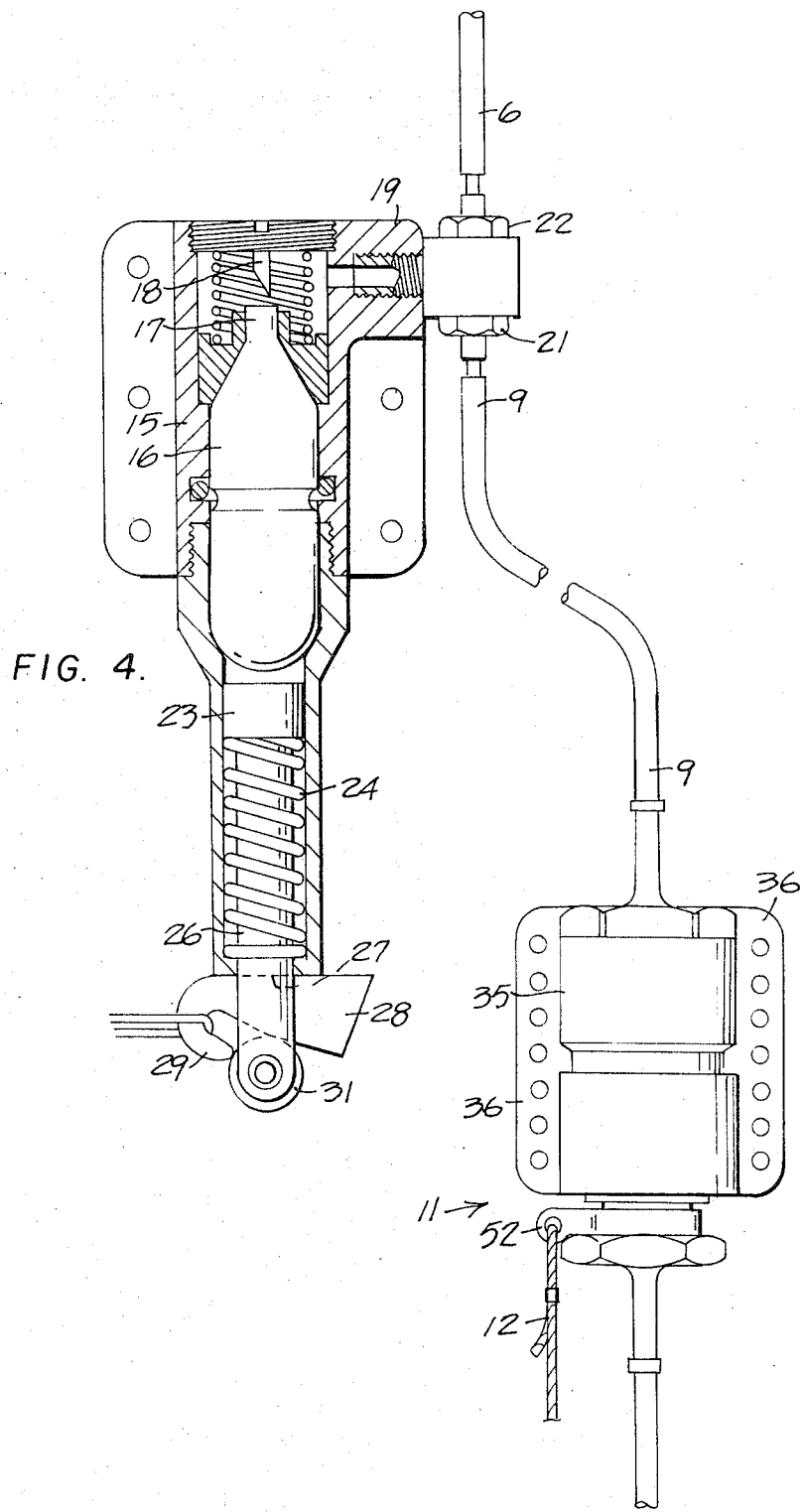
FIG. 4 is a sectional view of the gas supply device as connected to a conduit disconnector.
Figure 5:
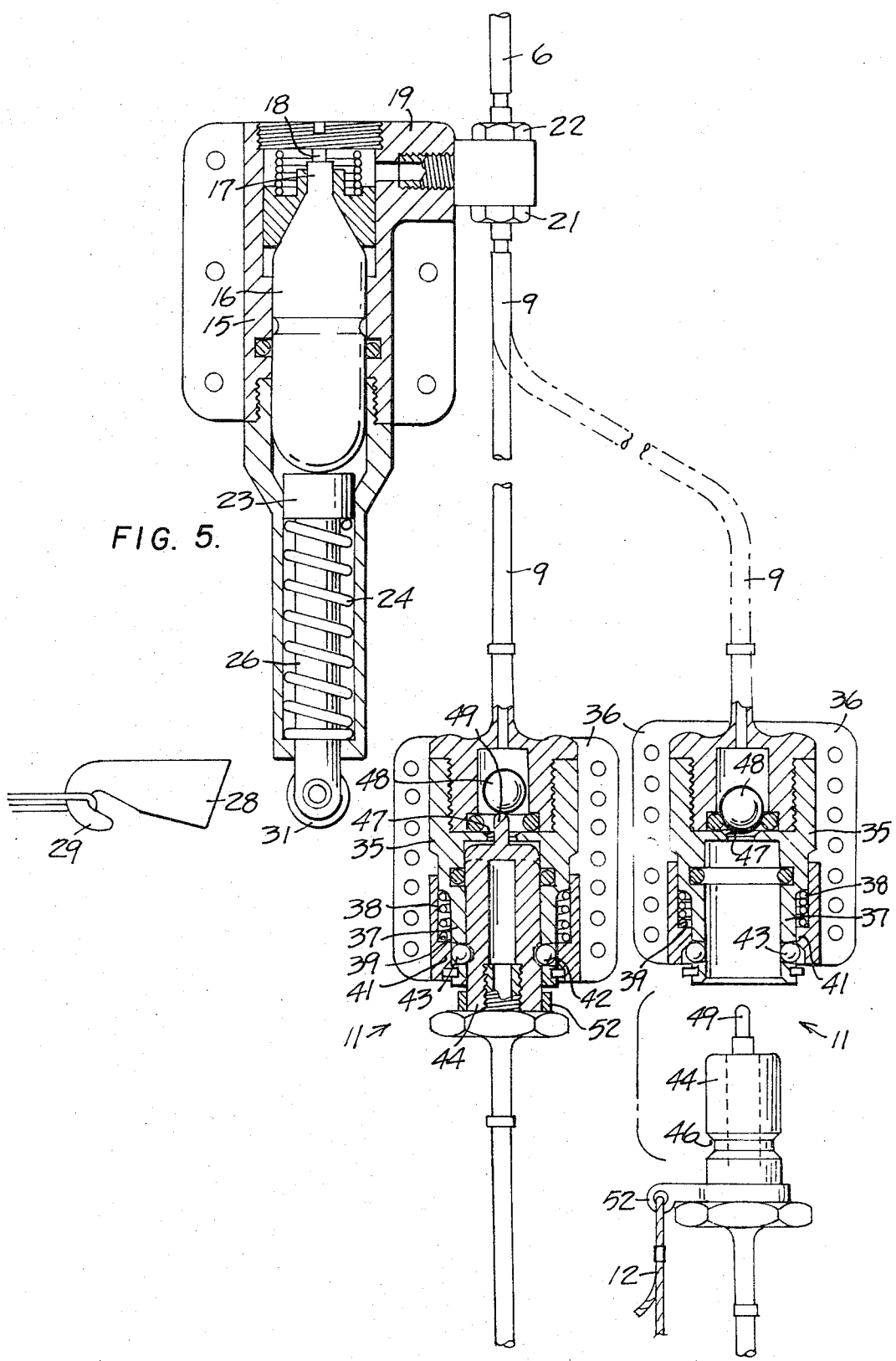
FIG. 5 is a sectional view of the gas supply device after the cartridge is pierced and showing the disconnect device in section in connected position and in disconnected position.
Figure 6:
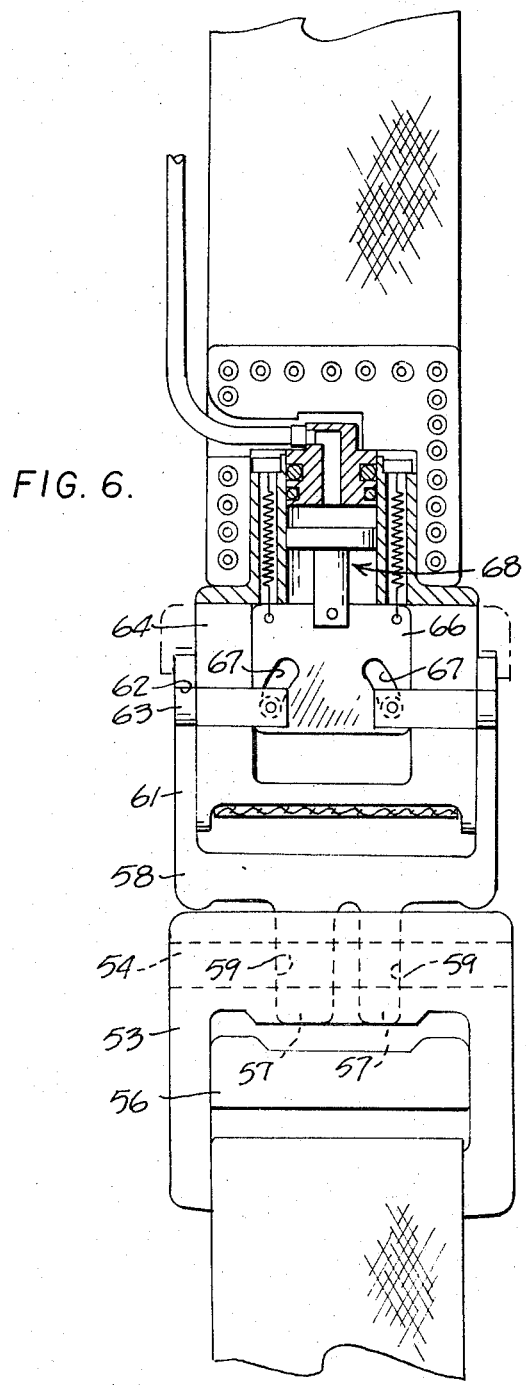
FIG. 6 is a sectional view of the gas actuated buckle release.

The harness 1 has buckles 2 connected to the straps or risers 3 for the canopy. Buckles 4 are on the usual lap belts 5 which support a survival kit, for instance of the type shown in U.S. Pat. No. 2,992,798. All the buckles 2 and 4 are operable by gas pressure as well as manually, being, for instance, of type shown in copending U. S. Patent application Ser. No. 887,929, filed Dec. 24, 1969, now U.S. Pat. No. 3,658,281.

Lines 6 and 7 are preferably flexible conduits to conduct gas under pressure from a gas supply device 8 to the canopy buckles 2. Lines 9 and 10 are also flexible conduits to conduct gas under pressure from said gas supply device 8 to the lap belt buckles 4.

An automatic disconnect device 11 is interconnected in line 9, and is anchored by means of a suitable cable 12 to an anchor 13 fixed in the aircraft, so that when the crewman is ejected, the cable 12 pulls the disconnect device 11 to sever the lap belt line 9 from the gas supply.

When the crewman wants to leave the ship quickly, he operates the gas supply device and releases gas under pressure through all the lines to release all the buckles, as indicated in FIG.2, whereupon the crewman is free to leave the aircraft.

Upon the ejection of the seat the cable 12 pulls the disconnect device 8 thereby to disconnect the lap belt line 9. After the crewman lands in the water or on land, he operates the gas supply device 8 to release the canopy buckles 4 thus freeing himself from the canopy, but retains the survival kit suspended on the lap belts 5.

The gas supply device in operation is similar to the type shown in said co-ending application and includes in the herein embodiment a cartridge casing 15 containing a cartridge 16 of the usual compressed gas type. The outlet end 17 of the cartridge 16 is adapted to be pierced by a piercing pin 18 held fixed in the outlet end of the cartridge casing 15. The outlet end 19 of the cartridge casing 15 is enlarged and has an outlet 21 to which is connected line 9. Another outlet 22 on the enlarged outlet end 19 of the of the cartridge casing 15 is connected to a canopy line 6. At the closed end of the cartridge 16 is reciprocably held a plunger 23 which is urged by a strong coil spring 24 toward and against the closed end of the cartridge 16. The plunger 23 has a stem 26 thereon extending through the adjacent end of the casing 15. The stem 26 has a transverse slot 27 which accommodates a wedge 28 which latter has a hook 29 thereon for suitable engagement by a cord or otherwise.

In order to cock the spring 24 the plunger 23 is pushed to compress the spring 24 thereby to project the stem 26 beyond the adjacent end of the casing 15 so as to permit the insertion of the wedge 28 into the slot 27 thereby to hold the spring 24 compressed. The outer end of the stem 26 is provided with a suitable abutment head 31. In order to operate the gas supply device 8 the wedge 28 is pulled out of the slot 27 whereupon the cocked spring 24 snaps the plunger 23 against the closed end of the cartridge 16 and forces the outlet end 17 of the cartridge 16 against the piercing pin 18 with such force that the outlet end is pierced, whereupon the escaping gas rapidly travels through the outlets 21 and 22 into the respective lines 9 or 6.

The automatic disconnect device 11 in the herein illustration includes a tubular casing 35 which has suitable flanges 36 provided with apertures for sewing or securing to a strap or to a harness. In the tubular casing 35 is slideable a tubular connector 37. A coil spring 38 surrounds a reduced end of the tubular connector and engages a shoulder 39 in the tubular casing 35. Adjacent the shoulder 39, inside of the tubular casing 35, is formed an inner annular flange 41. The tubular connector 37 has a plurality of tapered bearing pockets 42, each holding a ball 43. The bearing pockets on the balls in the initial position are in registry with the inner annular flange 41 to hold the balls 43 projecting inwardly of the tubular connector 37. A separable nipple 44 is inserted inside of the tubular connector 37 and it has an annular groove 46 engaged by the balls 43 to hold the nipple 44 in position. The lap belt line 9 is connected to the nipple 44. In the tubular connector is a valve seat 47 on which seats a ball valve 48. The nipple 44 has a finger 49 projecting from its inner end so that when the nipple 44 is in connected position the finger 49 pushes the ball valve 48 away from the valve seat 47 permitting gas to pass through line 9 to the lap belt buckles 4. The opening at the inner end of the nipple 44 adjacent said finger 49 permit gas to flow into and through the nipple 44. The nipple 44 has a suitable extension or ear 52 thereon to which is connected the cable 12. Thus as the crewman is ejected, the cable 12 pulls the nipple 44 which in turn momentarily pulls the tubular connector 37 against the action of the coil spring 38 until the balls 43 are pulled off the inner annular flange 41 and are permitted to move outwardly out of the groove 46 whereupon the nipple 44 is freed from the tubular connector 37. As the casing 35 and connector 37 are thus withdrawn from the nipple 44, the ball valve 48 seats on the valve seat 47. When the crewman lands and actuates the gas supply device 8, in the manner heretofore described, the gas presses the ball valve 48 on the valve seat 47 and the gas is directed through the canopy lines 6 and 7 to the canopy buckles 2 for quickly releasing the latter. Thus the lap belt buckles 4 remain connected and the crew man retains the survival kit on the lap belts 5 as long as needed.

For illustrative purposes in FIG. is reproduced the type of buckle that may be utilized herein. A female portion 53 of the buckle contains a rocking shaft 54 which is suitably rocked by manipulation by a hand lever 56 into position to release the prongs 57 of the separable male portion 58 from female pockets 59 in the manner described in the aforesaid copending application. On the male portion 58 is formed a yoke 61 the legs of which have aligned holes 62 engageable by projecting pins 63 in a casing 64 suitably secured to either one of the straps. A plate 66 reciprocates in the casing 64 and has in it converging curved slots 67 in which the inner ends of the pins are guided so that when the plate is moved toward the buckle the pins 63 are pulled out of the holes 62 and into the casing 64 to release the yoke 61. The plate 66 is moved into releasing position by a suitable plunger device 68 actuated by gas under pressure conducted through the respective gas lines into the plunger device 68. In this manner any or all the buckles can be released manually by the manipulating hand lever 56 or automatically released by gas under pressure in the manner heretofore described.

I claim:

1. In combination with a parachute harness having releasable buckles for connecting to the harness, riser straps from the parachute and having buckles connecting to the harness lap belts supporting a survival kit, harness release means comprising,
   means actuated by gas under pressure for releasing the respective buckles,
   supply means connected to the respective gas actuated means for supplying gas under pressure at will for release of the buckles,
   disconnect means interconnected between said gas supply means and the buckles of said lap belt normally being in position to conduct gas under pressure to the lap belt buckles,
   and means actuated by the ejection of the wearer of the harness from the aircraft for disconnecting said disconnect device from said gas supply means.

2. The invention specified in claim 1, and
manipulable means on each of said buckles for manually releasing the respective buckles.

3. The invention specified in claim 1, and
each of said gas pressure actuated means in each buckle including,
a member connected to the respective strap,
another member connected to the harness,
a connecting element between said members for holding said members together,
releasable means to hold said connecting element in connecting position,
and means actuated by gas under pressure to release said releasable means.

4. The invention specified in claim 1, and
a valve between said disconnect device and said gas supply means,
means of connection between said disconnect means and said valve means for keeping said valve open until said disconnect means are disconnected.

5. The invention specified in claim 4, and
manipulable means on each of said buckles for manually releasing the respective buckles.

6. The invention specified in claim 4, and
said gas supply means including,
a casing,
a cartridge containing gas under pressure in said casing,
manipulable means to pierce a cartridge to release gas under pressure therefrom,
gas lines connecting said casing to the respective buckles,
said disconnect means being interconnected in the gas lines communicating with the lap belt buckles.

7. The invention specified in claim 6, and
a normally closed valve interconnected between said disconnect device and said casing,
and means on said disconnect device to keep said valve open.

8. The invention specified in claim 7, and
said normally closed valve being a ball on a valve seat in said casing closed by the released gas pressure in said casing,
said means to keep the valve open, including
a projection from said disconnect means into said casing in the connecting position to lift said ball off said valve seat.

* * * * *